Oct. 20, 1931.  R. W. BULKELEY  1,828,355
AUTOMOBILE BODY
Filed March 22, 1927  4 Sheets-Sheet 1

Inventor
Ralph W. Bulkeley
By Frank E. Liverance Jr.
Attorney

Oct. 20, 1931.      R. W. BULKELEY      1,828,355
AUTOMOBILE BODY
Filed March 22, 1927      4 Sheets-Sheet 3
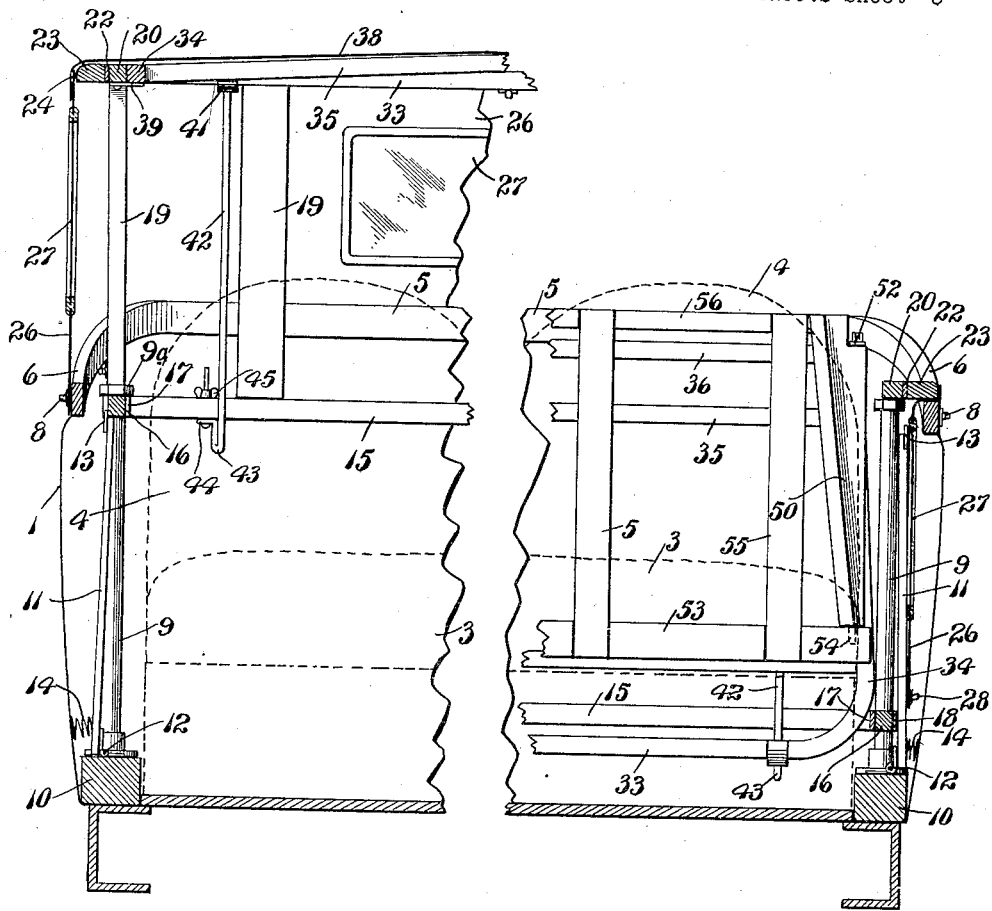
Fig.5.      Fig.6.
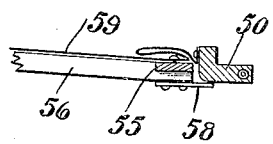
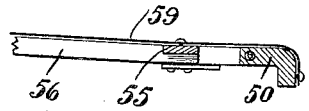
Fig.7.      Fig.8.
Inventor
Ralph W. Bulkeley.
By
Frank E. Liverance, Jr.
Attorney.

Oct. 20, 1931.  R. W. BULKELEY  1,828,355
AUTOMOBILE BODY
Filed March 22, 1927    4 Sheets-Sheet 4

Inventor
Ralph W. Bulkeley.
By
Frank E. Liverance Jr.
Attorney.

Patented Oct. 20, 1931

1,828,355

UNITED STATES PATENT OFFICE

RALPH W. BULKELEY, OF GRAND RAPIDS, MICHIGAN

AUTOMOBILE BODY

Application filed March 22, 1927. Serial No. 177,250.

This invention relates to automobile bodies and is more particularly concerned with a construction whereby an upper top structure is provided for the body of a motor vehicle which, when not in use, can be completely folded and telescoped within the body and entirely covered, disguised and which when in use makes a completely enclosed body having all of the advantages and characteristics thereof. Furthermore, if desired, the top covering for said structure and the frame on which it is mounted may be removed so that the motor vehicle can be equipped with a body having upstanding sides and back but with no upper cover which can be stored and carried in the automobile until such time as it is desired to use the same.

It is an object and purpose of the present invention to provide a simple and practical construction for effecting the ends stated, and to provide many novel details of construction and arrangement of parts for effectively securing the results desired whereby a rigid body is obtained but one which can be very readily folded and telescoped and disappeared from sight and completely disguised when it is not to be used.

For an understanding of the invention whereby these ends as well as the many others not at this time stated are attained, reference may be had to the following description taken in connection with the accompanying drawings, in which, Fig. 1 is an elevation of a motor vehicle equipped with my invention and with the body structure in operative position.

Fig. 5 is a fragmentary tranverse vertical section taken substantially on the plane of line 5—5 of Fig. 3, looking to the rear.

Fig. 6 is a like section with parts folded and telescoped to inoperative position.

Figs. 7 and 8 are transverse vertical sections through the front upper portion of the top, illustrating two different positions of the side members thereof, the first when it is folded for telescoping into the body of the car and the second when it is to be used as a top covering for the automobile body.

Figure 10:
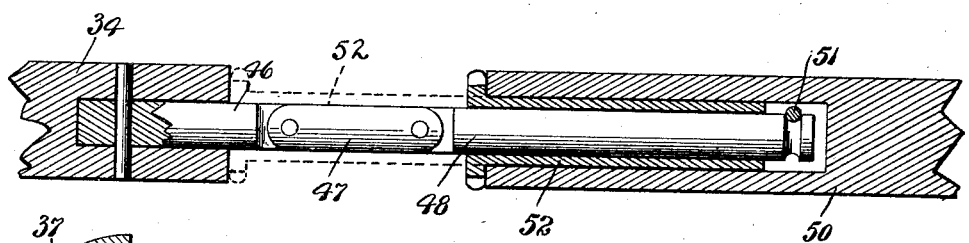
Figure 11:
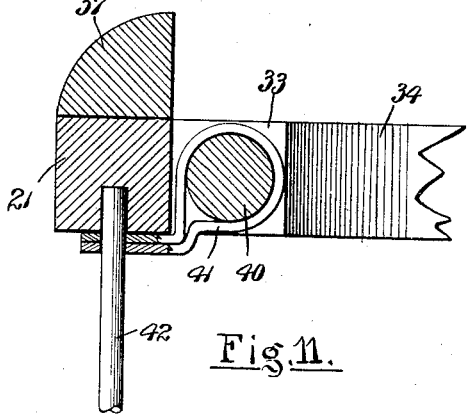

Fig. 10 is an enlarged fragmentary longitudinal section illustrating a particular type of folding and swivel joint used between the adjacent ends of the side members of the front and rear sections of the top cover, and Fig. 11 is a fragmentary enlarged vertical section, illustrating the sliding and hinged mount of the rear section of the top whereby it may be telescoped downwardy into the body of the vehicle.

Like reference characters refer to like parts in the different figures of the drawings.

Figures 1, 2:
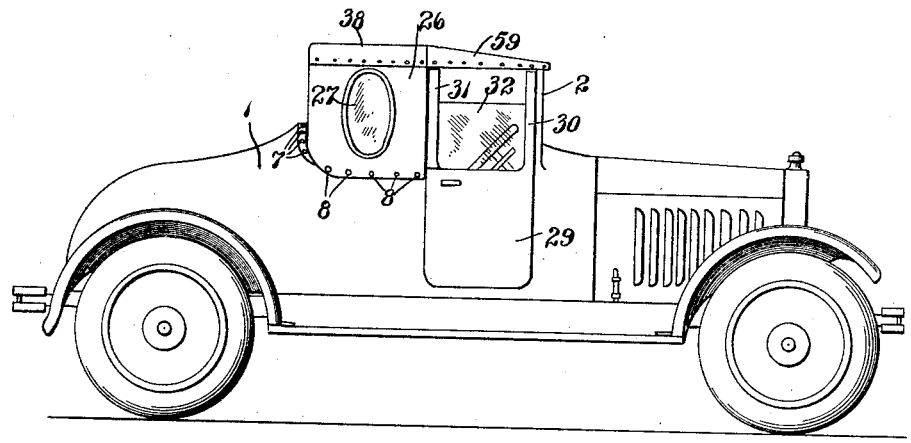
Fig. 2 is an enlarged fragmentary partial plan and horizontal section through the structure of my invention, the fabric coverings therefor being removed.

The automobile body 1 may be of any conventional construction, being equipped with the usual windshield 2 at the front of the driving compartment and having the usual seats 3 and backs 4, illustrated in dotted outline, such as are common in two passenger cars. The invention is shown as applied to this type of automobile. A rail 5 is located transversely across and at the upper side of the body back of said seats and at its end portions is curved downwardly and forwardly to make sides 6 which terminate at their front ends at the door openings. A plurality of fasteners 7 of conventional form are attached to and extend upwardly from the upper edge of the rail 5, being spaced apart as best shown in Fig. 2, while similar fasteners 8 are attached to and extend outwardly from the outer sides of the side rails 6. It is of course understood, that these rails are covered by the sheet metal of the body 1 so that a good appearance is presented.

At each side of the body within the same and at the outer sides of the seats 3 two spaced apart vertical posts 9 are located which are rigidly secured at their lower ends to sills 10 of the body frame. The posts 9 are of tubular form and extend upwardly substantially to the plane of the upper side of the side rails 6 and are equipped with stop nuts 9a at their upper ends. Midway between each pair of posts a latch bar 11 is located which has a hinged connection at 12 to the sill 10. The hinged connection is such that the bar may have a limited swinging movement in an outward direction. At its upper end it is equipped with a short metal plate 13 located at its outer side end extending a short distance above the upper end of the bar. The bar 11 is normally held at an inner position by a light coiled spring 14 located between the bar 11 at its lower end, and the sheet metal side of the body 1 as shown in Fig. 5.

A bar 15 lies slightly in front of and below the bar 5 substantially paralleling the same and at its ends is curved to extend forward. It is equipped with two extensions 16 which are secured to the forwardly curved ends to the bar 15 by means of metal plates 17 and 18, thus providing openings through which the posts 9 pass. The bar 15 with the extensions 16 attached thereto makes a U-shaped bow which is vertically slidable as a whole on the posts 9 which serves as guides therefor.

Figure 3:
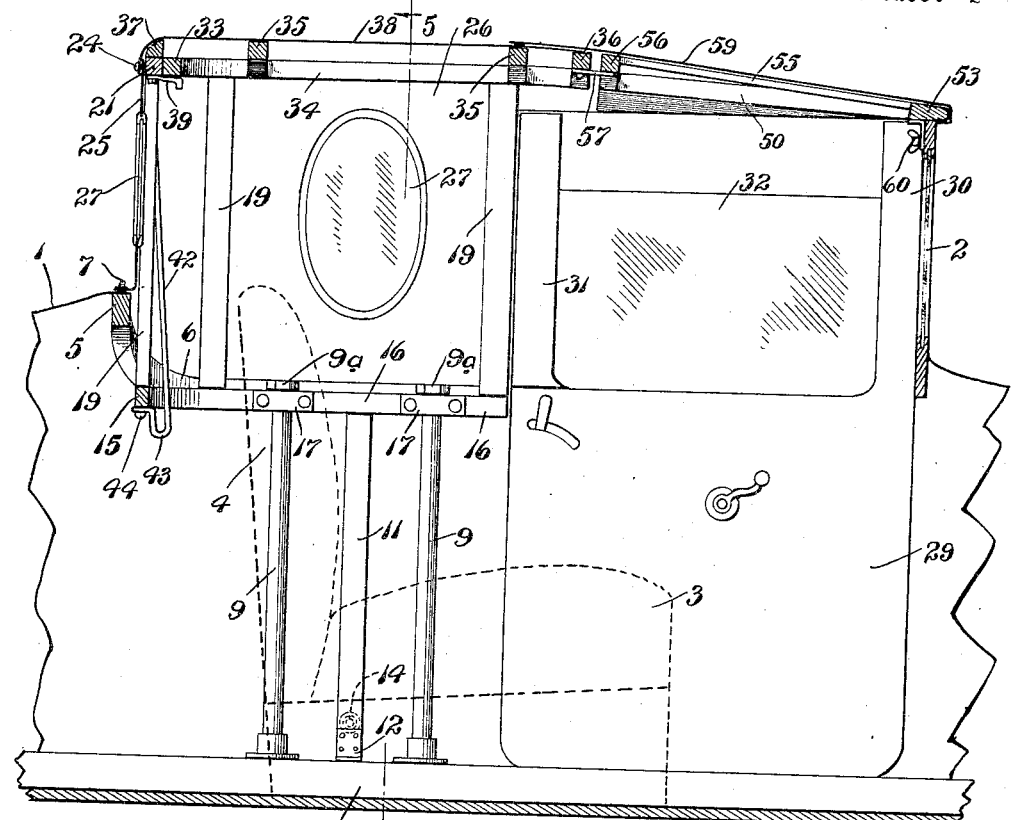
Fig. 3 is a fragmentary enlarged longitudinal vertical section through the motor vehicle showing the construction utilized to make a coupé body.

Vertical frame members 19 are attached at their lower ends to the bow at properly spaced apart distances and extend upwardly a distance. Those at the sides are connected at their upper ends to bars 20 there being one at each side of the vehicle, and those at the back are connected at their upper ends to a rear cross bar 21. The rear ends of the bars 20 and the ends of the bar 21 are secured together by a strap iron connection 22, best shown in Fig. 2, so that the lower bow comprised of the rear bar 15 with the forward extension 16 and the upper bow comprising the rear cross bar 21, the side bars 20 and connecting irons 22 with the intervening vertical frame members 19 make a frame which is vertically slidable as a unit on the guide posts 9 and which, in lower position, telescopes completely back of and at the sides of the seats and backs 3 and 4. This frame also may be elevated to an upper position until stopped by the stop nuts 9a whereupon the latch bars 11, pressed inwardly by springs 14, engage underneath the sections 16, as best shown in Fig. 5, and hold this frame in an upper position as shown in Figs. 3 and 5. To lower the frame it is necessary merely to disengage the bars 11. When lowered to lowermost position, or that shown in Fig. 4, the lower sides of the part 20 and lower edge of the irons 22 come against the upper ends of the upper posts 9. At each side of the vehicle and lying in the same plane with the side bars 20 described and attached thereto and the other irons 22 are filler bars 23 so that the same move up and down with the movements of said frame.

Figure 4:
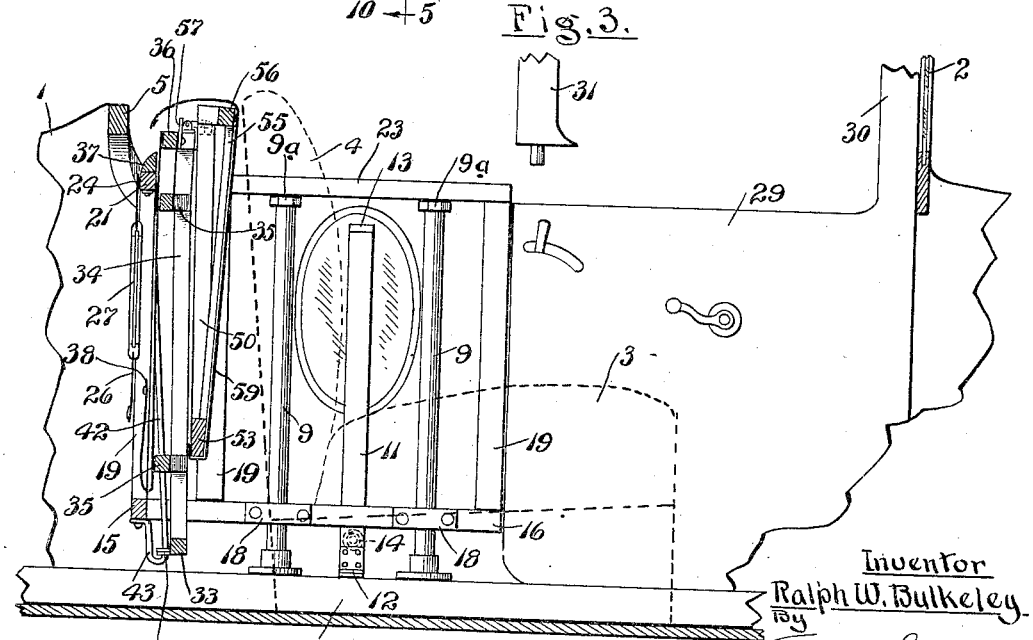
Fig. 4 is a similar section, illustrating the position of the parts when the same are folded and telescoped so as to be covered and out of sight whereby the motor vehicle will be an open car without any top structure.

Fasteners 24 of a conventional type are mounted upon the outer sides of the bars 21 and 23. A fabric covering having a back 25 and sides 26 is attached at its upper edges to said fasteners and at its lower edge portions to the fasteners 7 and 8 previously described. In these coverings rear and side windows 27 may be mounted. It is of course to be understood that the interior of the frame will be suitably upholstered so as to cover and disguise the frame members 16, 19 and the like. When the frame is telescoped downwardly into the main body of the vehicle the back 25 is disconnected from the fasteners 7 and drops with the frame in front of the rail 5 as shown in Fig. 4. The sides are disconnected from the fasteners 8 and drop with the frame downwardly into the main body of the vehicle outside of the bars 11 as shown in Fig. 6. Preferably, when the lower edges of the sides 26 are disconnected from the fasteners 8, the same are secured to similar fasteners 28 attached to the side of the lower bow, as shown in Fig. 2, so that the sides 26 of the covering move down with the frame unit when the same is telescoped into the body 1.

The doors 29, one at each side of the body, are hingedly mounted in the usual manner and each at its front edge has a vertical guide 30 which lies closely adjacent to the windshield 2. A second and detachable guide 31 is connected to and extends upwardly from the upper edge of each door. Between the guides 30 and 31 the usual glass 32 is mounted for sliding movement. The guides 31 are detachable in order that the same may be removed when the top is to be telescoped into the body as otherwise the same would be unsightly. The guides 30, however, lying directly back of the windshield 2 are permanently connected to the door.

The covering top of the structure is made of two sections. The rear section comprises a bow having a back bar 33 and spaced apart sides 34 bent forward from the ends of the back bar and a plurality of cross bows 35 and 36 extending between the sides 34. A filler 37 is attached to and secured to the upper side of the bar 21 and the fabric covering 38 is detachably secured by means of detachable fasteners to the outer sides of the parts 21 and the sides 34 of the bow described. This top section is supported on the frame unit by means of metal brackets 39 which are mounted on the undersides of the bars 21 and 20 as illustrated in Figs. 3 and 5. The support 39, shown in Fig. 3, may be turned so as to lie underneath the bar 21 when this top section is to be collapsed into the side and back frame unit.

At spaced apart points in the length of the bar 33 portions of the same are cut away to leave integral sections 40, circular in cross section (see Fig. 11), around which a strap hinge 41 is bent, the two ends thereof being brought together underneath the bar 21. Guide rods 42 at their upper ends are received in recesses in the under sides of the bar 21 of the upper bow of the frame and extend downwardly and slightly forward at an incline to the vertical below the lower frame bow 15, each at its lower end being formed with a reverse bend 43 terminating in a foot which comes underneath the bar 15. A bolt 44 passes upwardly through each of said feet and through the bar 15 receiving a wing nut 45 at its upper end. The rods 42 pass through the ends of the hinges 41, as shown in Fig. 11, so that said hinge members 41 may slide on the rods 42 when the supports 39 are disengaged from underneath the rear bar 33 and the top bow.

At the front end of each of the sides 34 of the top bow a short rod 46 is secured (see Fig. 10), to the outer end of which a link 47 is pivotally connected, the opposite end of the link having a pivotal connection to a rod 48 which extends into a recess or opening bored longitudinally into the rear end of a side bar 50, there being two of these bars mounted one at each side of the front section of the top member. The rod 48 at its inner end is grooved and a pin 51 passes through the side member 50 seating in said groove so that the member 50 may be turned about the axis of the rod 48 but cannot disconnect therefrom. A locking sleeve 52 is slidably mounted on the rod 48 and in one position may be inserted into the opening or recess in the rear end of the member 50 with which it is associated. In another position, or that shown in dotted lines in Fig. 10, it covers the link 47 and the adjacent ends of the rods 46 and 48 thereby locking the link and rods in longitudinal alignment.

The frame for the front section of the top comprises a front transverse bar 53 with which the side members 50 have a swivelled connection, pins 54 extending from said members 50 into suitable recesses in the front bar 54 as shown in Fig. 2. The frame also includes a plurality of bars 55 which connect the front bar 53 with a rear bar 56 for the section which lies closely adjacent and parallel to the front bar or bow 36 of the rear section of the top. Supporting plates 57 are secured to the under side of the bar 36 and project forward therefrom so that the rear bar 56 may rest thereon. Also at each end of the bar 56 a metal plate 58 is secured to the under side thereof and extends a short distance outward beyond each end of bar 56, as shown in Figs 7 and 8, the purpose of which will later appear. A fabric covering 59 covers the frame made and extends to the rear over a portion of the covering 38 for the rear section and has a detachable snap fastener connection to suitable fasteners extending upwardly from the front cross bar or bow 35 of the rear section of the top.

With the two top cover sections in alignment as shown in Fig. 3 the front bar 53 of the front section may be detachably connected by the usual securing means 60 to the frame of the windshield 2. With the parts in the position shown in Fig. 3 a rigid and secure construction is provided making an enclosed coupé body.

Figure 9:
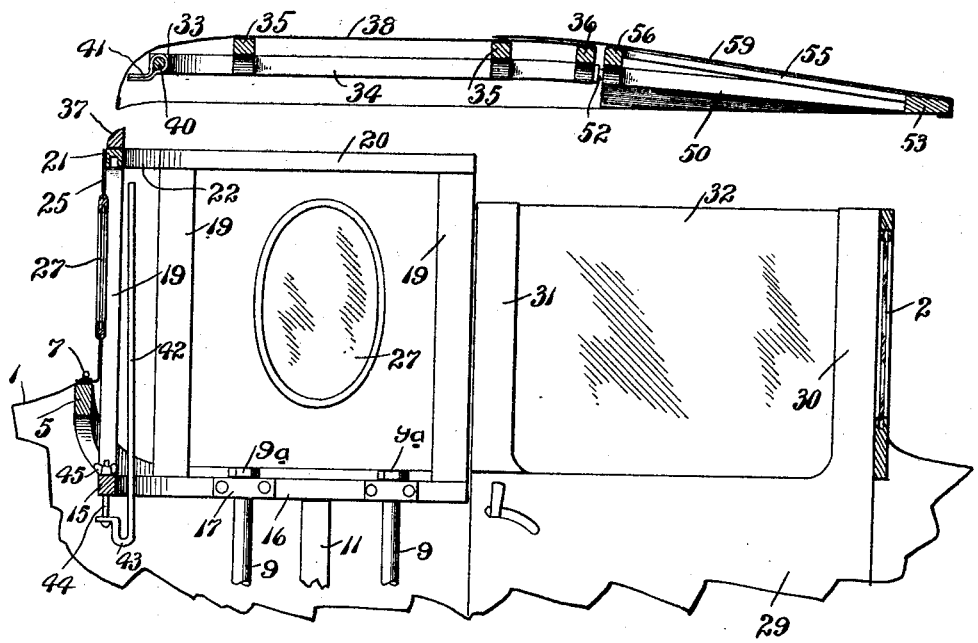
Fig. 9 is a fragmentary longitudinal vertical section similar to that shown in Fig. 3 showing the top cover member disconnected.

When it is desired to change the car to an open car the fasteners at 60 are first disconnected from the windshield frame and the rear edge and side portions of the fabric coverings 38 are disconnected from the fasteners at 24. The sleeves 52 are moved from the dotted line position which they occupy normally, shown in Fig. 10, to the position in full lines in Fig. 10, thereby releasing the pivot connections of the links 47 to rods 46 and 48. After this is done the members 50 are turned from the position shown in Fig. 8, which position they occupy when the top is in service, to the position shown in Fig. 7 where they rest upon the plates 58. The supports 39 are turned to lie underneath the bar 21 whereupon the rear section of the frame may slide downwardly on the guide rods 42 by reason of the sliding connection made being hinge members 41 with said rods. The rear ends of the rear section will slide down and as this occurs the front section is folded against the under sides of the rear section. The rear edge of the fabric covering 59 is first disconnected from the fasteners which have previously connected it to the bar 35 as shown in Fig. 9. This folding of the front section of the top against the under side of the rear section is permitted by reason of the pivoted link construction shown in Fig. 10. Accordingly, the whole top member is thus folded in front of the rear side of the telescoping frame, such folding and collapsing of the top member taking place before the back and side unit is lowered into the body of the vehicle.

After the top member has been disposed of in the manner described, the latch bars 11 are pressed outwardly at their upper ends thereby removing the supports for the telescoping frame, which as a unit, and with the top folded therein, as shown in Fig. 4, drops downwardly into the position shown in Fig. 4, being guided on the posts 9. After the auxiliary body and the top therefor have been telescoped into the body of the vehicle back of the seats, a covering boot may be attached to completely cover the same and thus disguise the structure and present a good appearance. There is plenty of space back of the seats 4 for the reception of the folded top as well as the back of the telescoping frame, as is fully shown in Fig. 4.

At times it may be desirable to have the back and sides of the coupé body in upper position, but with the top cover removed. This can be done readily with the structure outlined, it being merely necessary to release the thumb nuts 45 until the upper ends of the rods 42 disconnect from the recesses in the under side of the bar 21 (see Fig. 9), whereupon the straps 41 are readily disconnected from said rods and with the further disconnection of the attaching devices 60 and the disconnection of the fabric cover 38 from the detachable fasteners used to secure it to the bars 23 and 21 the entire top member may be removed as shown in Fig. 9, folded and placed back of the seats 3.

The construction described is very effective for providing interchangeable bodies in a motor vehicle whereby the same may be changed from an open car showing no evidence of any top whatever to a completely enclosed body. This construction has been built and tested and has proved very practical, serviceable and satisfactory. It lends itself to a good appearance under both conditions. The invention is defined in the appended claims and is to be considered comprehensive of all forms of structure coming within their scope.

I claim:

1. In combination, a motor vehicle body, vertical guide rods located within and at each side of the body, heads at the upper ends of the guide rods, an auxiliary body comprising a back and two spaced apart forwardly extending sides slidably mounted on the guide rods for vertical movements, a latch bar hingedly mounted at its lower end at each side of the body and within the same adapted to engage underneath the lower end of each side of the auxiliary body when it is in upper position, and spring means acting on the latch bar to normally move it to engaging position.

2. A folding top for motor vehicles comprising, a rear section including a frame having sides and cross bows and a covering thereover, a front section comprising, a frame, including a front bar, a rear bar and connecting bars between the same, sides swivelly connected at their front ends to the ends of the front bar whereby said sides may be turned on a horizontal axis, a folding joint between the sides of the rear section and said sides of the front section, whereby the front frame may be folded back upon the top section, a covering for said front frame having a portion extending over the front portion of the rear section of the top, and releasable means for attaching said covering at its rear edge to the rear section of the top.

3. A top structure for motor vehicles comprising, a rear section including a frame having sides and cross bows, a covering for said rear section, a front section comprising, a front bar, a rear bar and connecting bars between the front and rear bars, means for supporting the rear bar of said front section attached to the rear section of the top, two side bars, one at each side of said front section, means for swivelly mounting each of said side bars at its front end on the front bar of said front section, a pin permanently secured and extending forward from the front end of each of the sides of the frame of the rear section of the top, a link pivotally connected to each pin, a rod pivotally connected to the front end of each link and extending into the rear end of each side bar of the front section of the top, means for connecting said rods to said side bars whereby each side may turn about the horizontal axis of said rod, a sleeve slidably mounted on each of said rods and received within the rear end of each of said side bars of the front section of the top movable rearwardly to cover the joints between said link and the pin and rod to which it is pivotally connected, and a covering for the front section of the frame secured to the front and side bars thereof.

4. In combination with a vehicle body, an auxiliary body having a back extending above said vehicle body, means for mounting said auxiliary body for vertical movement whereby it may be telescoped inside of said vehicle body, a top having a forward and rear section hinged together whereby one section may be folded against the other, and means for pivotally connecting the rear edge of the rear top section to the back of the auxiliary body for vertical movement from the top to the bottom thereof, whereby the rear edge of the top section may be moved to the bottom of the auxiliary body and the front section of the top may be folded against the rear section thereof and both sections of the top folded against the back of the auxiliary body.

5. In combination with a vehicle body, a top having a forward section and a rear section hinged together whereby one section may be folded against the other, means for connecting the rear end of the rear top section to a support, and means for folding the side edge portions of the forward section about axes transverse to the hinge axis.

In testimony whereof I affix my signature.

RALPH W. BULKELEY.